United States Patent
Ly et al.

(10) Patent No.: US 8,823,520 B2
(45) Date of Patent: Sep. 2, 2014

(54) RECONFIGURABLE NETWORK ENABLED PLUG AND PLAY MULTIFUNCTIONAL PROCESSING AND SENSING NODE

(75) Inventors: Sidney Ly, Seattle, WA (US); Ali Salour, Fenton, MO (US); Jai J. Choi, Sammamish, WA (US); Bruce S. Howard, Bellevue, WA (US); Laurance N. Hazlehurst, Seattle, WA (US)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 13/162,543

(22) Filed: Jun. 16, 2011

(65) Prior Publication Data

US 2012/0319838 A1 Dec. 20, 2012

(51) Int. Cl.
*G08B 21/00* (2006.01)
*G08B 26/00* (2006.01)
*G08B 29/00* (2006.01)
*H04W 4/02* (2009.01)
*H04W 4/18* (2009.01)
*H04L 29/08* (2006.01)
*G06F 17/30* (2006.01)

(52) U.S. Cl.
CPC *H04W 4/02* (2013.01); *H04W 4/18* (2013.01); *H04L 67/02* (2013.01); *H04L 67/12* (2013.01); *H04L 67/34* (2013.01); *G06F 17/30867* (2013.01)
USPC .......... 340/540; 340/506; 340/505; 340/546; 702/188; 709/224; 709/223; 709/230

(58) Field of Classification Search
CPC .......... H04W 4/02; H04W 4/18; H04L 67/02; H04L 67/12; H04L 67/34; G06F 17/30867; G06F 17/3089
USPC ......... 340/604, 540, 870.01, 450.2, 584, 527, 340/3.32, 670, 506, 505, 10.1, 500, 546, 340/407.1, 545.5; 702/188, 33–80, 127; 709/217–226, 230, 203, 201; 715/702, 715/763, 863; 345/156
See application file for complete search history.

(56) References Cited

U.S. PATENT DOCUMENTS

| 7,609,205 | B2 | 10/2009 | Haskell |
| 7,911,338 | B2 * | 3/2011 | Naeve et al. .............. 340/539.23 |
| 8,174,378 | B2 * | 5/2012 | Richman et al. .............. 340/521 |
| 8,274,783 | B2 * | 9/2012 | Polizzotto et al. ....... 361/679.01 |
| 8,576,073 | B2 * | 11/2013 | Mooring et al. .............. 340/546 |
| 2002/0013538 | A1 * | 1/2002 | Teller ............................ 600/549 |

(Continued)

FOREIGN PATENT DOCUMENTS

| WO | 0101366 | A2 | 1/2001 |
| WO | 2008016339 | A1 | 2/2008 |

OTHER PUBLICATIONS

PCT International Search Report mailed Aug. 6, 2012.

*Primary Examiner* — Hoi Lau
(74) *Attorney, Agent, or Firm* — Toler Law Group, PC

(57) ABSTRACT

In one embodiment, a data acquisition device comprises a plurality of sensors to detect an environmental condition, a configurable processor coupled to the plurality of sensors, wherein the configurable processor is configured to receive one or more signals from the plurality of sensors and process the one or more signals to generate environmental data representative of the environmental condition, and a first input/output module to transmit the data to a remote device. Other embodiments may be disclosed.

20 Claims, 5 Drawing Sheets

(56) References Cited

U.S. PATENT DOCUMENTS

| | | |
|---|---|---|
| 2004/0225955 A1 | 11/2004 | Ly |
| 2005/0275527 A1* | 12/2005 | Kates ................. 340/539.22 |
| 2007/0100479 A1* | 5/2007 | Ahmed ...................... 700/47 |
| 2007/0103292 A1* | 5/2007 | Burkley et al. .......... 340/539.13 |
| 2007/0103319 A1* | 5/2007 | Pedraza et al. ............ 340/604 |
| 2007/0222585 A1* | 9/2007 | Sabol et al. ............. 340/539.11 |
| 2007/0252692 A1* | 11/2007 | Wallace et al. .......... 340/539.26 |
| 2007/0288849 A1* | 12/2007 | Moorer et al. ............... 715/736 |
| 2008/0030345 A1* | 2/2008 | Austin et al. .............. 340/572.8 |
| 2008/0036591 A1* | 2/2008 | Ray ........................... 340/540 |
| 2008/0246629 A1* | 10/2008 | Tsui et al. ............... 340/870.07 |
| 2008/0249654 A1* | 10/2008 | Pedraza et al. ............. 700/208 |
| 2008/0297365 A1* | 12/2008 | Welles et al. ................. 340/670 |
| 2009/0100422 A1* | 4/2009 | Abe ............................. 717/174 |
| 2009/0195497 A1* | 8/2009 | Fitzgerald et al. ........... 345/156 |
| 2009/0302996 A1* | 12/2009 | Rhee et al. .................... 340/3.32 |
| 2010/0039284 A1* | 2/2010 | Hall et al. ................ 340/825.36 |
| 2010/0123572 A1* | 5/2010 | Thubert et al. ............... 340/527 |
| 2010/0127880 A1* | 5/2010 | Schechter et al. ............ 340/584 |
| 2010/0261465 A1* | 10/2010 | Rhoads et al. ................ 455/420 |
| 2010/0286490 A1* | 11/2010 | Koverzin ..................... 600/301 |
| 2011/0035271 A1* | 2/2011 | Weaver et al. ............. 705/14.41 |
| 2012/0131217 A1* | 5/2012 | Delorme et al. .............. 709/230 |
| 2012/0223830 A1* | 9/2012 | Tyler ......................... 340/450.2 |
| 2012/0313791 A1* | 12/2012 | Mehta ....................... 340/870.01 |
| 2012/0319838 A1* | 12/2012 | Ly et al. ........................ 340/540 |

* cited by examiner

US 8,823,520 B2

RECONFIGURABLE NETWORK ENABLED PLUG AND PLAY MULTIFUNCTIONAL PROCESSING AND SENSING NODE

BACKGROUND

The subject matter described herein relates to automated monitoring and reporting of environmental data. Complex manufacturing environments may experience a wide variety of conditions that may affect operations of machinery or materials being worked. Existing environmental monitoring systems tend to be integrated into existing machinery and operate using proprietary measurement, processing, and communication protocols. Monitoring systems which are more flexible and which operate according to open standards may find utility in complex manufacturing environments.

SUMMARY

Embodiments of systems and methods in accordance with the present disclosure may provide improved environmental condition monitoring and reporting. In one embodiment, a data acquisition device comprises a plurality of sensors to detect an environmental condition, a configurable processor coupled to the plurality of sensors, wherein the configurable processor is configured to receive one or more signals from the plurality of sensors, process the one or more signals to generate environmental data representative of the environmental condition, implement a device profile for web services (DPWS) interface, present a graphical representation of the plurality of environment sensors, and make the environmental data available for access by one or more remote devices via the DPWS interface.

In another embodiment, a method to monitor environmental conditions comprises detecting, in a plurality of environmental sensors mounted on an electronic device, environmental conditions in a plurality of environmental sensors receiving, in a configurable processor coupled to the plurality of sensors, one or more signals from the plurality of sensors, processing, in the configurable processor, the one or more signals to generate environmental data representative of the environmental condition, and transmitting the data to a remote device.

Further areas of applicability will become apparent from the description provided herein. It should be understood that the description and specific examples are intended for purposes of illustration only and are not intended to limit the scope of the present disclosure

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for environmental condition monitoring, reporting, and data analysis are described herein. Specific details of certain embodiments are set forth in the following description and in FIGS. 1-6 to provide a thorough understanding of such embodiments. One skilled in the art will understand, however, that alternate embodiments may be practiced without several of the details described in the following description.

Figure 1:
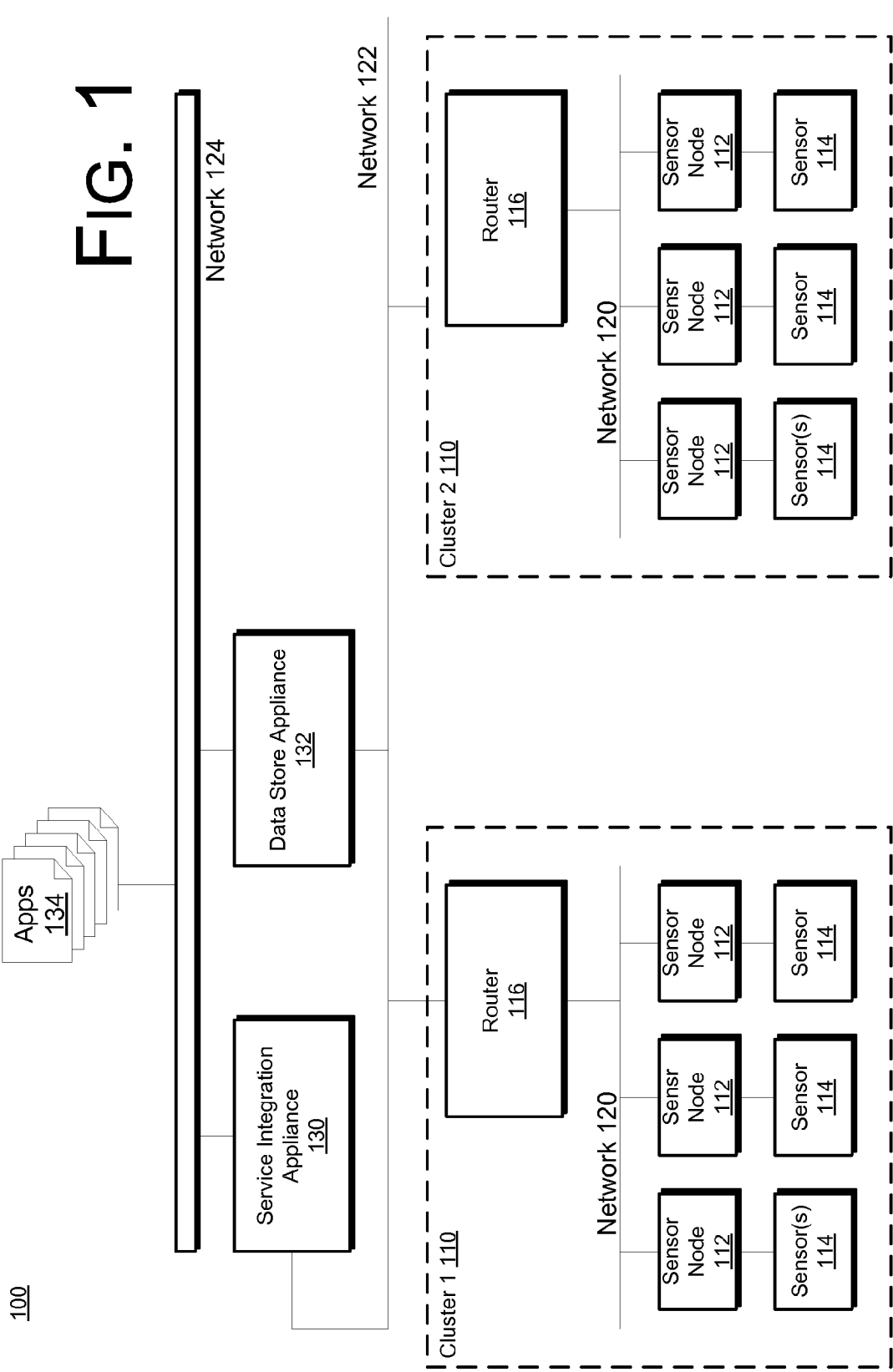
FIG. 1 is a schematic illustration of a system for environmental condition monitoring and reporting according to embodiments.

FIG. 1 is a schematic illustration of a system for environmental condition monitoring and reporting according to embodiments. Referring to FIG. 1, in one embodiment the system 100 comprises a plurality of condition monitoring clusters 110, identified in the drawing as cluster 1 and cluster 2. Clusters 110 comprise one or more sensor nodes 112, each of which comprises one or more sensors 114. Sensor nodes 112 may be communicatively coupled via a network 120 and a router 116, which provides for communication between the nodes 112 and remote devices. Sensor nodes 112 and sensors 116 will be explained in greater detail below.

Clusters 110 may be coupled to one or more external servers by a network 122. In the embodiment depicted in FIG. 1, the clusters 110 are coupled to a service integration appliance 130 and a data store appliance 132. Other external servers may be coupled to clusters 110. One or more applications 134 may be accessible to the service integration appliance 130 and data store appliance 132 via a network 124.

Figure 2:
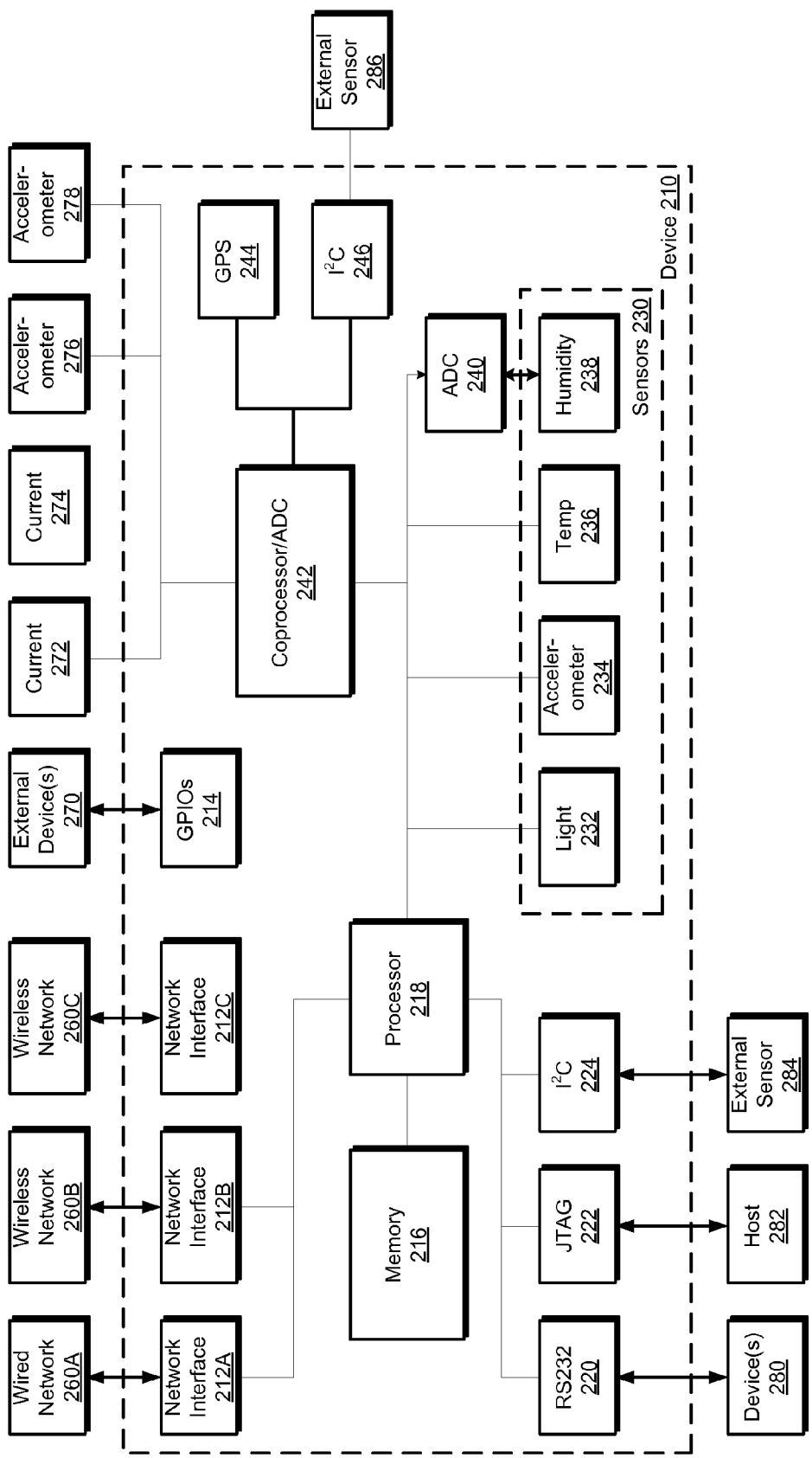
FIG. 2 is a schematic illustration of a device for environmental condition monitoring and reporting according to embodiments.

FIG. 2 is a schematic illustration of a device 210 for environmental condition monitoring and reporting according to embodiments. Referring to FIG. 2, in some embodiments device 210 comprises one or more environmental condition sensors 230. Sensors 230 may include a light sensor 232, which may be embodied as a photodetector, a photodiode, or the like, an accelerometer 234, a temperature detector 236, and a humidity detector 238. Other environmental condition detectors may be integrated into device 210. By way of example, in some embodiments environmental condition monitoring may include monitoring conditions relevant to the health of a machine and consumables used by the machine.

In the embodiment depicted in FIG. 2 the detectors 232, 234, 236 include internal analog to digital (A/D) converters, such that the outputs of the detectors 232, 234, 236 are in digital format. By contrast, the output of humidity detector 238 is in analog format, and is input into an A/D converter 240 for conversion to a digital format.

The outputs of detectors 230 are input into a processor 218. In some embodiments the processor 218 may be implemented as a configurable processor, e.g., a microprocessor or a field programmable gate array (FPGA). A memory module 216 may be coupled to processor 218 to store logic instructions and/or data generated by the processor 218.

Device 210 may comprise a coprocessor 242 that comprises an internal A/D converter to receive inputs from one or more environmental monitoring devices external to device 210. In the embodiment depicted in FIG. 2, device 210 may receive input from external current monitors 272, 274, and one or more accelerometers 276, 278. The coprocessor 242 may also receive inputs from a GPS (Global Positioning System) module 244 and from one or more external sensors 286 via an IIC bus 246.

Device 210 may comprise one or more network interfaces 212A, 212B, 212C, which may be referred to collectively herein by reference numeral 212. Network interfaces 212 provide a communication interface to one or more external communication networks. By way of example, network interface 212A may provide an interface to a wired network 260A such as an Ethernet, while network interfaces 212B, 212C provide interfaces to wireless networks 260B, 260C, respectively. Wireless networks 260B, 260C may be implemented, e.g., as WiFi network which operate pursuant to an IEEE 802.11.x standard, WiMAX networks, or cellular networks. The particular communication standard pursuant to which the wireless networks 260B, 260C operate is not critical.

Device 210 may further include one or more communication buses to provide communication with external devices 280, or a host computer 282 or external sensor 284. In the embodiment depicted in FIG. 2, device 210 may comprise one or more buses which operate according to the RS232 protocol, the JTAG (Joint Test Action Group) bus protocol, or the IIC (Inter-Integrated Circuit) protocol. Again, the particular communication standard pursuant to which the respective communication buses operate is not critical.

Figure 3:
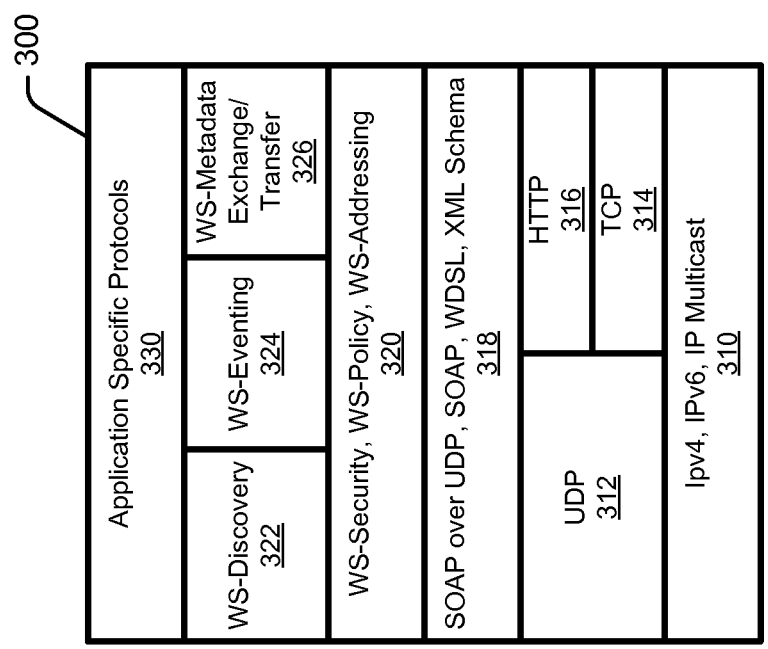
FIG. 3 is a schematic illustration of a protocol stack which may be implemented by a controller in a device for environmental condition monitoring and reporting according to embodiments.

In some embodiments the processor 218 executes logic instructions which establish a web-based interface to the various sensors 230 on the device 210. By way of example, the processor 218 may implement a Device(s) Profile for Web Services (DPWS) interface to provide for discovery and communication capabilities for the various sensors 230 on device 210. FIG. 3 is a schematic illustration of a protocol stack which may be implemented by a controller in a device for environmental condition monitoring and reporting according to embodiments. Referring to FIG. 3, in some embodiments the protocol provides for communication via an internet protocol (IP) layer 310. A packet management layer such as a UDP service 312 or HTTP/TCP services 316 314 utilize the services of IP layer 310. A messaging framework layer 318 implements a SOAP (Simple Object Access Protocol) service. A web services security (WS-Security) layer 320 provides security services over the SOAP interface. A WS-Discovery service 322, WS-Eventing service 324, and a WS-Metadata Exchange/Transfer service 326 operate over the WS-Security layer 320. One or more application specific protocols 330 may operate on top of the WS protocols.

Figure 4:
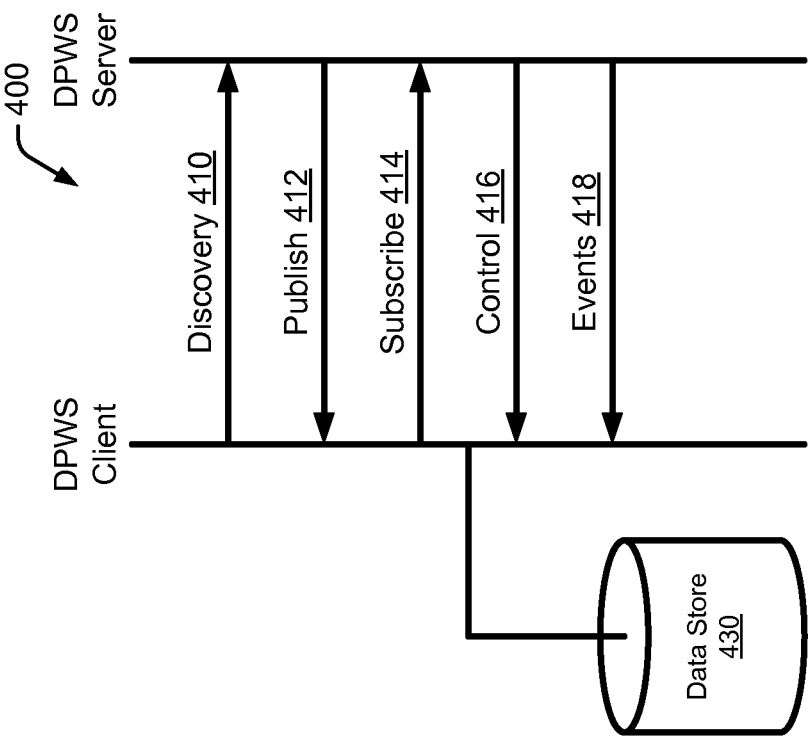
FIG. 4 is a schematic illustration of a communication protocol which may be implemented by a device for environmental condition monitoring and reporting according to embodiments.

FIG. 4 is a schematic illustration of a communication protocol that may be implemented by a device for environmental condition monitoring and reporting according to embodiments. In some embodiments, the DPWS protocol implements a client-server model 400 pursuant to which a DPWS client can initiate a discover request 410 to discover one or more WS-enabled devices on a network. In response to a discovery request, a DPWS server may publish 412 information about one or more DPWS enabled devices managed by the DPWS server. The DPWS client may initiate a subscribe request 414 to subscribe to information feeds or other services from the DPWS server. The DPWS server may provide control messages 416 and event messages 418 to the DPWS client. The DPWS client may store data collected from the DPWS server in a data store 430.

As mentioned above, in practice, the processor 218 may implement a DPWS protocol module to provide DPWS functionality. Thus, in operation, the device 210 may function as a DPWS server to provide web-based access to services and information provided by sensors 230 on the device 210 and information collected from external devices such as current sensors 272, 274, accelerometers 276, 278, and other external devices 270. Aspects of the DPWS interface will be explained with reference to FIG. 5, which is a screen shot that illustrates properties of logical objects in a system for environmental condition monitoring And reporting according to embodiments.

Figure 5:
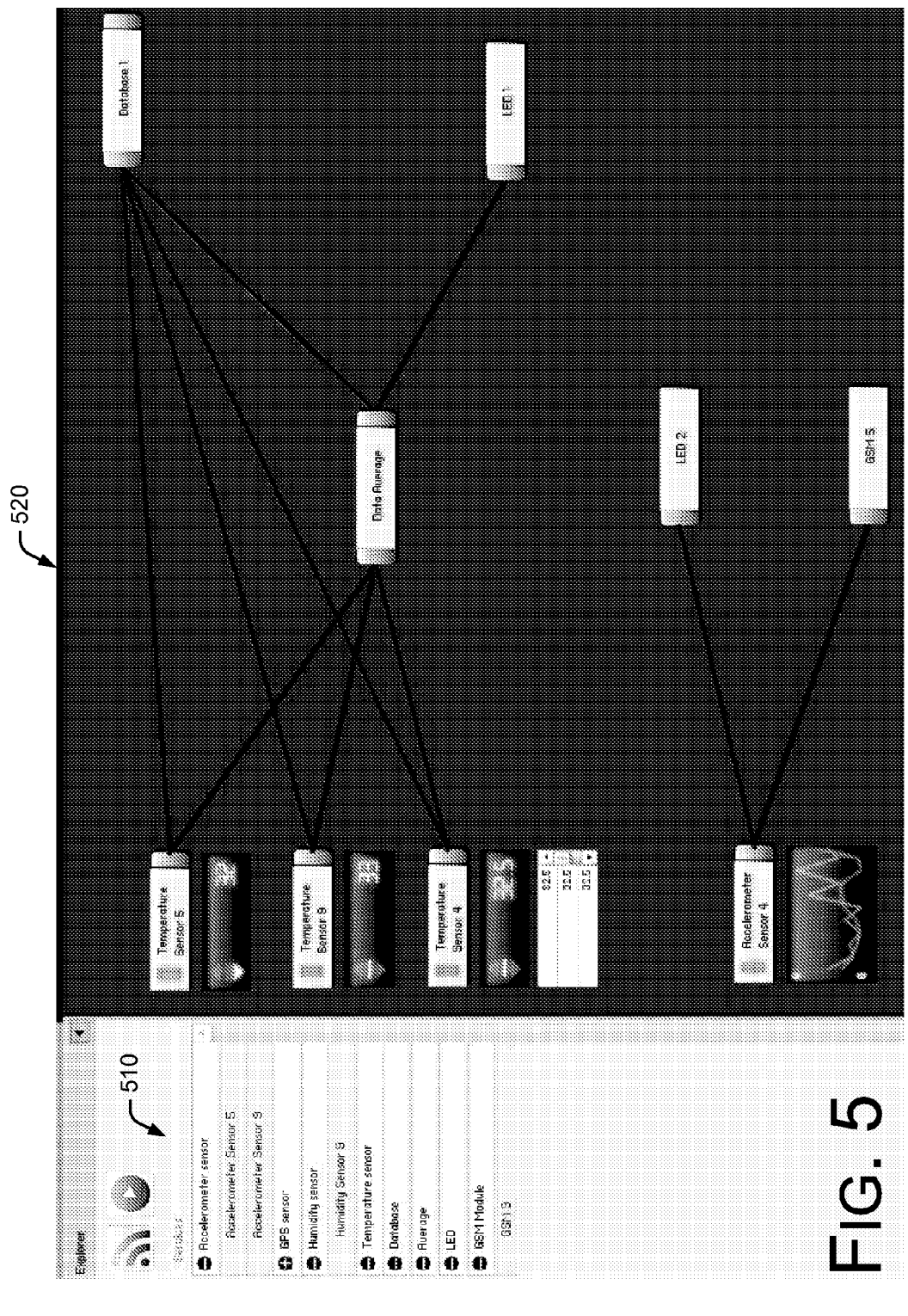
FIG. 5 is a screen shot which illustrate properties of logical objects in a system for environmental condition monitoring and reporting according to embodiments.

Referring to FIG. 5, when sensor nodes 112 are connected to a network, the server nodes 112 can automatically be discovered by a DPWS client device that is coupled to the network. In some embodiments the DPWS interface includes a graphical user interface (GUI) 500 that presents a listing 510 of the various devices discovered by the DPWS client. The interface 500 further includes a window 520 in which logical objects representing selected discovered devices may be presented and managed by the DPWS client device. As mentioned above, a DPWS client device can subscribe to data feeds from discovered sensors. The window 520 presents an object-oriented view of the discovered sensors and the associated data feeds. Logical operations may be performed on data collected from the sensors by dragging and dropping selected sensors onto the window 520 and connecting the outputs of the logical objects to logical operators. Thus, as illustrated in FIG. 5, the outputs of temperatures sensor identified as Temperature Sensor 3, Temperature Sensor 4, and Temperature 5 may be input to Database 1 and to a Data Average logical operator, which averages the temperature readings from the sensors. The output of the data average operator may also be input to Database 1. In addition, the Data Average logical operator may comprise one or more internal logical operators that generate a signal if the temperature reading meets a criterion. The signal may be output to a warning device, e.g., a light emitting diode identified on the screen shot by LED 1. FIG. 5 also depicts the output of an accelerometer sensor connected to an LED identified as LED 2 and a GSM module depicted as GSM 5.

One skilled in the art will recognize that the interface 500 enables a user to discover networked devices and capabilities thereof, and to collect and manipulate data from the sensors without possessing specific knowledge of operational characteristics of the device or communication protocols pursuant to which the device operates. Data may be collected, processed and stored using simple drag and drop techniques that present a pictorial model of the data processing environment. The graphical depiction of the window 520 may be stored in a storage medium.

Figure 6:
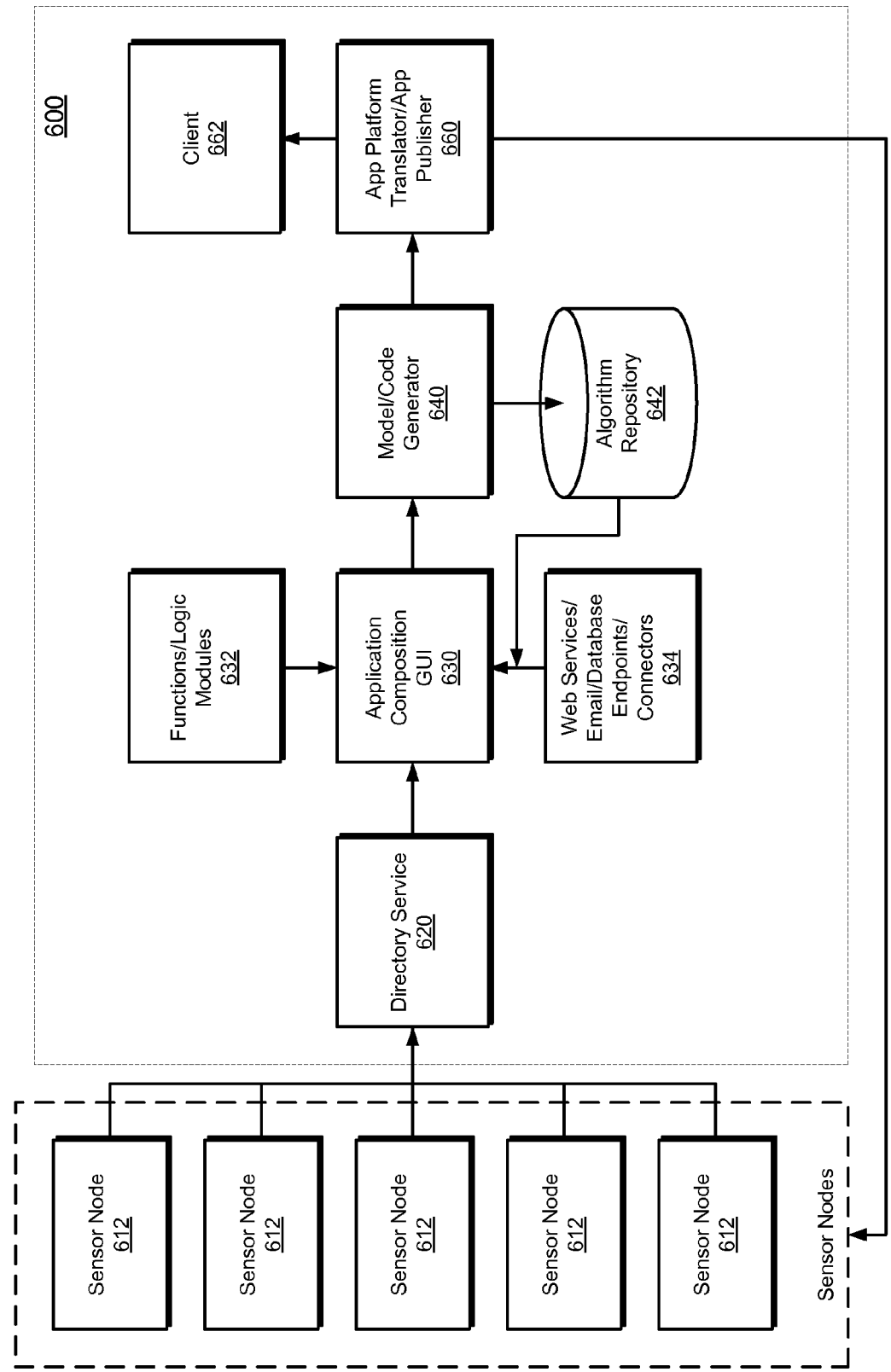
FIG. 6 is a schematic illustration of a logical view of a system for environmental condition monitoring and reporting according to embodiments.

FIG. 6 is a schematic illustration of a logical view of a system for environmental condition monitoring and reporting according to embodiments. Referring to FIG. 6, a plurality of sensor nodes 612 may be distributed in locations around a manufacturing environment. By way of example, sensors 612 may be placed proximate working tools or at important locations on an assembly line. The sensors may be distributed at various locations in a manufacturing facility or may be geographically distributed in different facilities.

Sensor nodes 612 are communicatively coupled to a directory service module 620. In some embodiments directory service module 620 discovers and maintains a directory of networked devices on sensor nodes 612. The directory is made accessible to clients 662. An application composition GUI 630 is communicatively coupled to directory service 620 and provides a service to permit users to construct applications, e.g., using the graphical techniques described with reference to FIG. 5. The application composition GUI 630 may utilize inputs from the sensor nodes 612, one or more functions or logic modules 632, and inputs from one or more web services, email, and database endpoint/connectors 634. The graphical constructs generated by the application composition GUI 630 are input to a model/code generator 640, which converts the graphical constructs into an application which may executed on a processing device. In some embodiments the application may be stored in an algorithm repository 642 and may also be passed to an application platform translator/publisher module 660, which publishes the application for use by a client 662. Applications may also be published for use by the processor(s) 218 in the sensor nodes.

In the foregoing discussion, specific implementations of exemplary processes have been described, however, it should be understood that in alternate implementation, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A data acquisition device, comprising:
a plurality of sensors to detect environmental conditions;
a configurable processor coupled to the plurality of sensors, wherein the configurable processor is configured to:
receive one or more signals from the plurality of sensors;
process the one or more signals to generate environmental data representative of the environmental conditions;
implement a device profile for web services (DPWS) interface;
generate a graphical representation, wherein the graphical representation includes a first portion that displays a listing of devices, functions, and sensors of the plurality of sensors and wherein the graphical representation includes a second portion, wherein the second portion is configured to display a representation of a particular sensor of the plurality of sensors, display a portion of the environmental data associated with the particular sensor, and establish an interaction of the portion of the environmental data associated with the particular sensor with one or more devices from the listing, one or more functions from the listing, or combinations thereof; and
make the graphical representation available for access by one or more remote devices via the DPWS interface.

2. The data acquisition device of claim 1, wherein the plurality of sensors comprises at least one of a light sensor, an accelerometer, a temperature sensor, a humidity sensor, and a position sensor.

3. The data acquisition device of claim 1, further comprising a coprocessor coupled to the configurable processor, wherein the coprocessor is configured to be selectively coupled to one or more external sensor devices to receive second environmental data.

4. The data acquisition device of claim 3, further comprising an input/output module coupled to the coprocessor to receive the second environmental data from one or more external computing devices.

5. The data acquisition device of claim 1, further comprising an input/output module to send the graphical representation to a remote device of the one or more remote devices, wherein the input/output module comprises a first communication interface to couple the data acquisition device to a wired network or a second communication interface to couple the data acquisition device to a wireless network.

6. The data acquisition device of claim 1, wherein the configurable processor is further configured to:
analyze the environmental data; and
generate an alarm signal when a value of the environmental data associated with a sensor of the plurality of sensors satisfies a threshold.

7. The data acquisition device of claim 1, wherein the configurable processor is further configured to:
generate one or more command signals in response to the environmental data; and
transmit the one or more command signals to a transducer.

8. The data acquisition device of claim 1, wherein the configurable processor is configured to enable the graphical representation to be modified by enabling an item in the listing displayed in the first portion of the graphical representation to be dragged and dropped into the second portion of the graphical representation.

9. The data acquisition device of claim 1, wherein the configurable processor is further configured to:
receive an input from a first remote device of the one or more remote devices via the graphical representation, wherein the input provides at least one instruction regarding operations of the particular sensor; and
in response to the input, configure the particular sensor in accordance with the at least one instruction.

10. The data acquisition device of claim 9, wherein the configurable processor is further configured to implement peer-to-peer communication with the first remote device.

11. A method to monitor environmental conditions, comprising:
detecting, via a plurality of environmental sensors mounted on an electronic device, environmental conditions;
receiving, at a configurable processor coupled to the plurality of sensors, one or more signals from the plurality of sensors;
processing, via the configurable processor, the one or more signals to generate environmental data representative of the environmental conditions;
implementing, via the configurable processor, a device profile for web services (DPWS) interface;
generating, in the DPWS interface, a graphical representation, wherein the graphical representation includes a first portion that displays a listing of devices, functions, and sensors of the plurality of sensors and wherein the graphical representation includes a second portion, wherein the second portion is configured to display a representation of a particular sensor of the plurality of sensors, display a portion of the environmental data associated with the particular sensor, and establish an interaction of the portion of the environmental data associated with the particular sensor with one or more devices from the listing, one or more functions from the listing, or combinations thereof; and making the environmental data available for access by one or more remote devices via the DPWS interface.

12. The method of claim 11, wherein the plurality of environmental sensors comprises at least one of a light sensor, an accelerometer, a temperature sensor, a humidity sensor, and a position sensor.

13. The method of claim 11, wherein the electronic device further comprises a coprocessor coupled to the configurable processor, wherein the coprocessor may is be selectively coupled to one or more external sensor devices to receive second environmental data.

14. The method of claim 13, wherein at least one input/output module is coupled to the coprocessor to receive the second environmental data from one or more external computing devices.

15. The method of claim 11, further comprising coupling the electronic device to a wired network, coupling the electronic device to a wireless network, or both.

16. The method of claim 11, further comprising:
analyzing the environmental data; and
generating an alarm signal when a value of the environmental data associated with a sensor of the plurality of sensors satisfies a threshold.

17. The method of claim 11, further comprising:
generating one or more command signals in response to the environmental data; and
transmitting the one or more command signals to a transducer.

18. The method of claim 11, further comprising modifying the graphical representation in response to user input that drags an item from the listing to the second portion and drops the item in the second portion.

19. The method of claim 11, further comprising:
receiving an input from a first remote device of the one or more remote devices via the graphical representation, wherein the input provides at least one instruction regarding operations of the particular sensor; and
in response to the input, configuring the particular sensor in accordance with the at least one instruction.

20. The method of claim 19, wherein the configurable processor is further configured to implement peer-to-peer communication with the first remote device.

\* \* \* \* \*